United States Patent

[11] 3,591,762

| [72] | Inventor | Milton Hinden<br>15 Bay Link, Massapequa, N.Y. 11758 |
|---|---|---|
| [21] | Appl. No. | 49,254 |
| [22] | Filed | June 24, 1970 |
| [45] | Patented | July 6, 1971<br>Continuation-in-part of application Ser. No. 797,603, Feb. 7, 1969. |

[54] WELDING APPARATUS
3 Claims, 7 Drawing Figs.

| [52] | U.S. Cl. | 219/98 |
|---|---|---|
| [51] | Int. Cl. | B23k 9/20 |
| [50] | Field of Search | 219/98, 99, 100 |

[56] References Cited
UNITED STATES PATENTS

| 3,401,250 | 9/1968 | Logan | 219/98 |
|---|---|---|---|
| 3,414,699 | 12/1968 | Neumeier | 219/95 |
| 3,448,237 | 6/1969 | Logan | 219/98 |

*Primary Examiner*—J. V. Truhe
*Assistant Examiner*—R. O'Neill
*Attorneys*—Mark T. Basseches and Paula T. Basseches

ABSTRACT: A resistance-welding apparatus is disclosed in which a welding circuit is automatically closed to produce a resistance weld responsive to the exertion of an optimum pressure of the welding pin tip against the work surface, thus to assure the production of a weld connection of optimum efficiency.

PATENTED JUL 6 1971
3,591,762
SHEET 1 OF 2
FIG.3
FIG.4
FIG.5
FIG.6
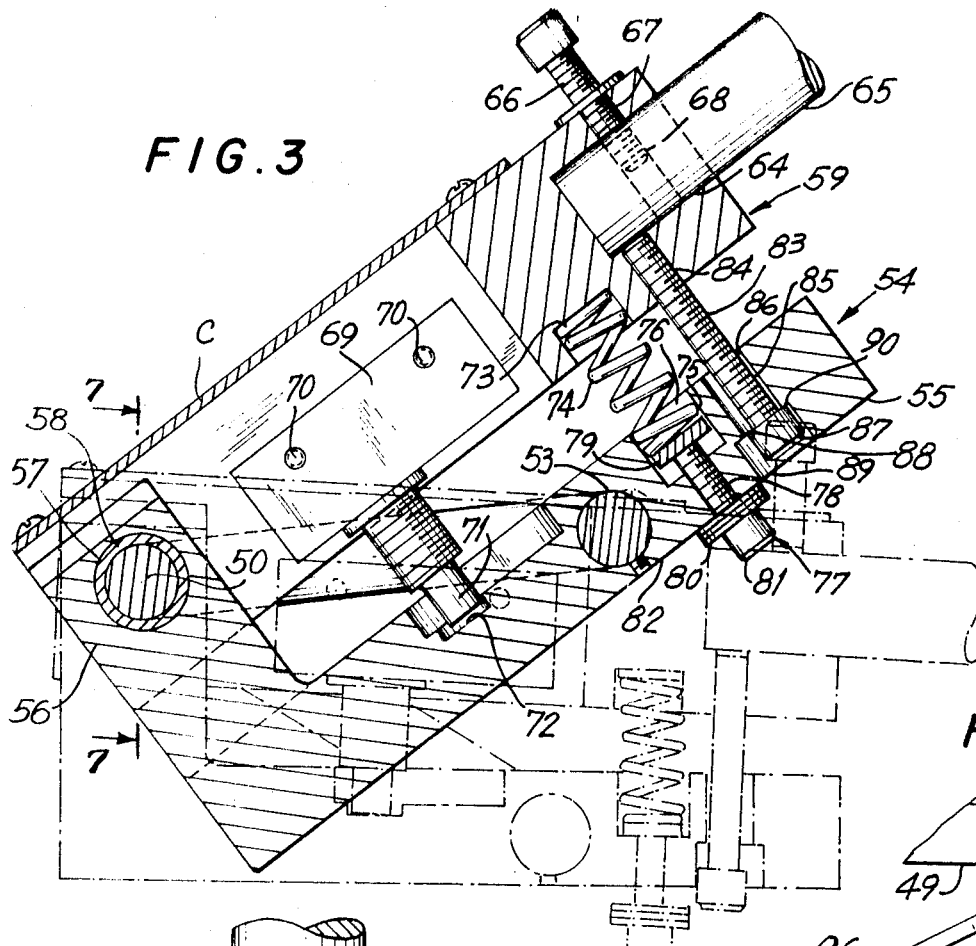
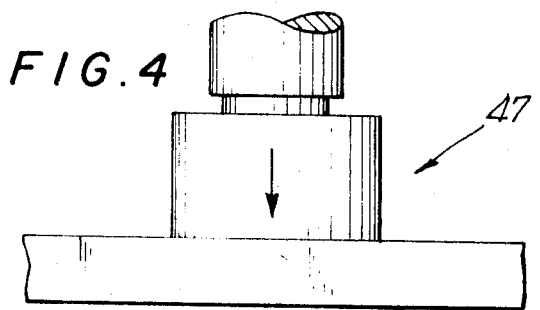
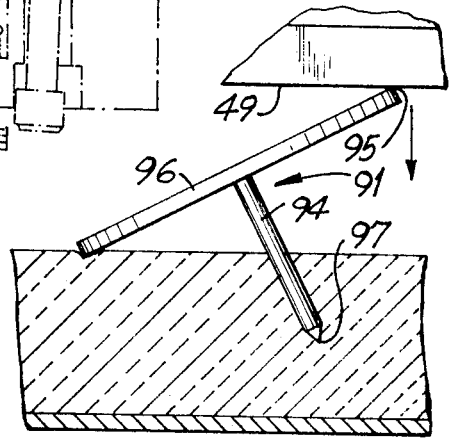
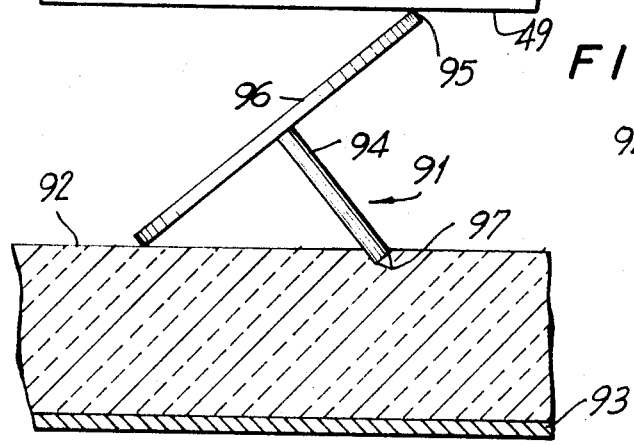
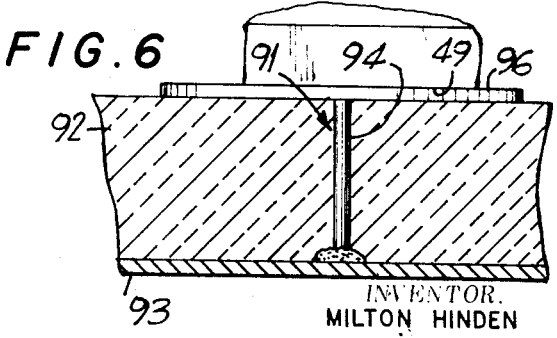
INVENTOR.
MILTON HINDEN
BY
ATTORNEY

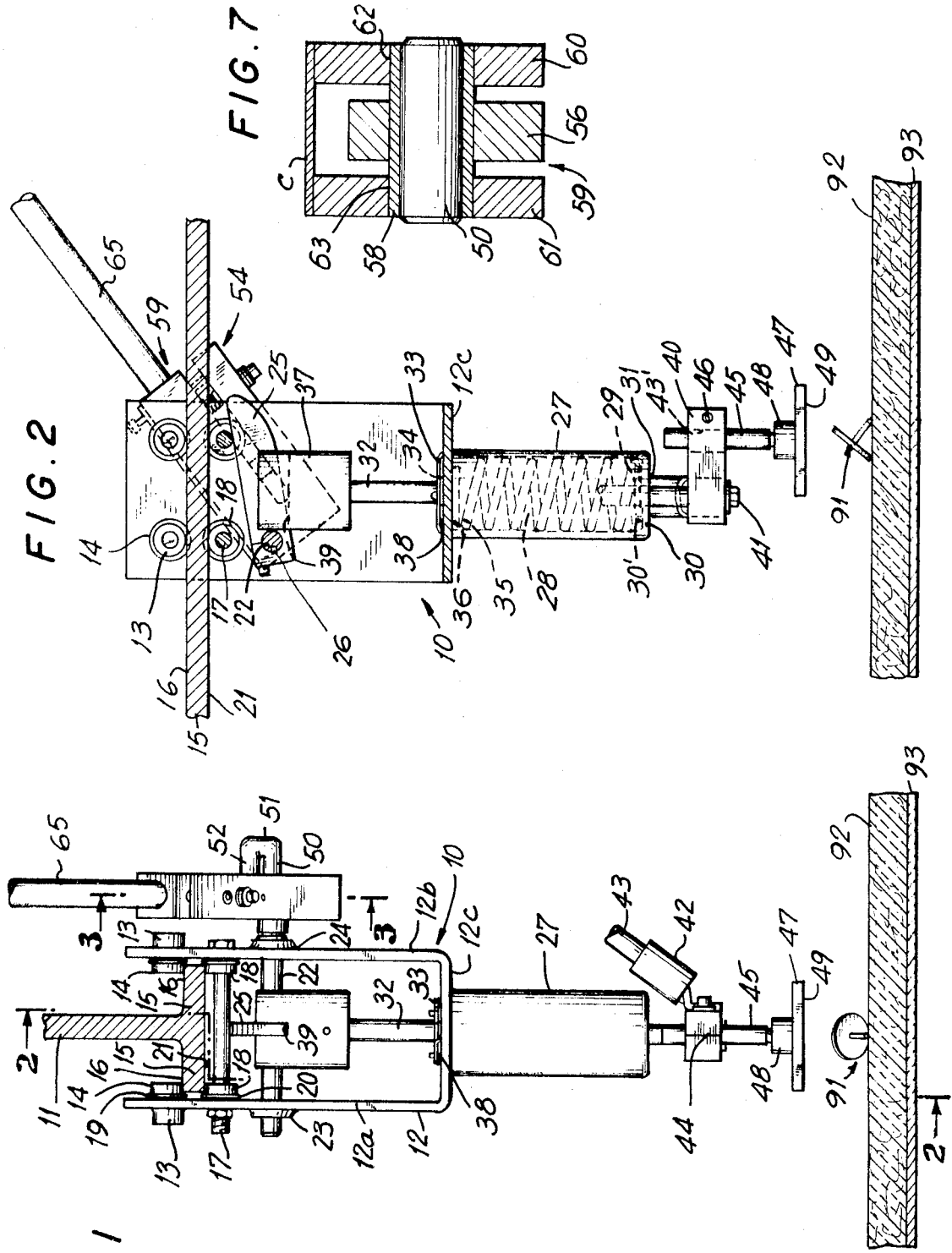

WELDING APPARATUS

This application is a continuation in part of my application Ser. No. 797,603, filed Feb. 7, 1969, entitled METHOD AND APPARATUS FOR ATTACHING INSULATION TO DUCT WORK.

This invention relates to a welding apparatus and more particularly to a resistance-welding apparatus whereby welding pins are attached by resistance welding to a substrate or work surface, such as the surface of a duct, through a batt or mass of insulating material, thus to secure the material to the duct surface.

In my aforesaid copending application there is described a method for attaching insulating material, such as fiber glass batts or the like, to duct work, by a resistance-welding method wherein welding current is passed through the length of the shank of a welding pin. The pin has an enlarged head portion and is pressed through the insulation material until the tip engages the substrate. A current flow through the shank of the pin is initiated, inducing a melt and fusion of the tip of the pin to the duct or substrate.

I have unexpectedly discovered that the formation of a high efficiency weld, e.g., a weld in which the pin is securely attached to the duct, may be best achieved by initiating the flow of welding current after the point of the pin has been pressed against the duct surface with a predetermined controlled force. I have determined that the amount of force is important, and that if too much or too little force is applied, there is substantial likelihood that an imperfect weld or no weld will be formed.

As noted in my copending application, it is imperative that the welding pin tip be carefully formed and have a desired degree of sharpness. When a pin of the hardness set out in my said application is used under the conditions therein set forth I have discovered that an optimum weld is achieved when, at the time of initiating the flow of welding current, the welding pin is urged against the duct surface with a force of from about 60 lbs. to 130 lbs. I have found that when forces above the noted forces are applied, a blunting of the pin results causing a high percentage of welds rejected by reason of the poor connection between the pin and the substrate. In other instances, I have found that where such high pressure is exerted, the shank of the weld pin overheats, with consequent damage to the insulation material adjacent the shank. If sufficient pressure is not applied, at the initiation of current flow it is often the case that arcing or defacing of the pin tip results, precluding the formation of a proper weld even if the force is subsequently increased.

I have surmounted the aforesaid problems by the provision of welding apparatus including a lost motion coupling interposed between the welding electrode and the pressure applying means which advances the electrode into welding position. A switch member is carried by the noted parts in such manner that a predetermined relative movement of the lost motion coupling shifts the sense of the switch, thereby to initiate the flow of current.

An adjustment spring is interposed between the elements of the lost motion coupling in such manner that the spring resists relative movement of the lost motion coupling parts so that such movement can be obtained only after a predetermined compression or extension of the adjustment spring has been achieved. By this means, i.e., by controlling the spring forces within a selected tolerance range, the exact pressure required to permit a selected degree of movement of the lost motion coupling parts, may be accurately controlled, thereby providing an accurate control over the pressure exerted on the welding pin at the very moment current flow is initiated.

SUMMARY OF THE INVENTION

This invention may be summarized as directed to an improved resistance welding apparatus for affixing insulating material to ducts, etc., and having an electrode carried on a vertically movable welding piston, an operating handle for driving the piston and a lost motion coupling interposed between the handle and the piston. Adjustment spring means are interposed between the handle and piston, which spring means are set to provide a degree of relative movement between the noted parts when a predetermined force is exerted by the welding pin against the workpiece.

A switch mechanism is positioned to sense the desired degree of relative movement and to activate the welding circuit when such degree of movement has been achieved. The initiation of a welding cycle is thus made dependent upon the existence of a predetermined force against the pin.

By providing a force responsive to initiation of the welding cycle, the formation of a proper weld is assured without any likelihood of damage to the insulating material.

The spring means which serve to control the pressure required to institute a current flow, also functions to feed the pin a controlled amount after the weld commences.

Accordingly, it is an object of the invention to provide an improved resistance-welding apparatus which incorporates an adjustable pressure-sensing switch between the welding electrode and the means for advancing the electrode toward the workpiece, such that welding current is caused to flow by a predetermined, controlled pressure exerted by the welding pin against the workpiece.

A further object of the invention is the provision of a device of the type described in which, by the use of a simple adjustment spring apparatus, accurate control of the pressures required to initiate welding may be obtained.

A further object of the invention is the provision of a device of the type described in which the adjustment spring causes a continued feed of the pin at a controlled pressure after commencement of the weld.

To attain these objects and such further objects as may appear herein or be hereinafter pointed out, reference is made to the accompanying drawings, forming a part hereof, in which:

FIG. 1 is a front elevational view of a welding apparatus in accordance with the invention;

FIG. 2 is a vertical cross-sectional view of the apparatus of FIG. 1, taken on the line 2-2 thereof;

FIG. 3 is a magnified cross section taken on the line 3-3 of FIG. 1;

FIGS. 4, 5 and 6 are magnified view of the welding electrode and welding pin in progressive stages of positioning of the pin and formation of the weld;

FIG. 7 is a section taken on the line 7-7 of FIG. 3.

Referring now to the drawings, there is shown in FIG. 1 a welding apparatus including a welding head 10 mounted on a horizontally directed support rail 11 for translatory movement therealong. The welding head includes a yoke or U-shaped frame 12 carrying four upper stub shafts 13 on which are rotatably mounted four upper ball bearing guide roller members 14 which engage the rail 11.

The rail 11 is in the form of an inverted T, including laterally directed branches 15, 15. The rollers 14 engage the upper surface 16 of the branches. A pair of cross-shafts 17 extend between the legs 12a, 12b of the U-shaped frame 12, the shafts 17 carrying at their leg-adjacent ends lower guide rollers 18.

The guide rollers 14 and 18 are preferably provided with outwardly extending shoulders 19, 20, respectively, which shoulders outwardly lap the end portions of the laterally directed branches 15 of the rail so as to prevent side-to-side shifting movement of the head 10 relative to the rail.

It will be seen from the foregoing description that four rollers 18 are disposed against the under surface 21 of the rail 11, and four rollers 14 are disposed against the upper surface 16 of said rail 11, thus securely mounting said yoke to the rail to permit translatory relative movement between the noted parts, while preventing vertical relative movement.

A horizontal cross-shaft 22 is suitably journaled in antifriction bearing members 23, 24, disposed in opposed coaxial relation on the legs 12a and 12b, respectively, of the yoke. The cross-shaft 22 carries an eccentric cam member 25, which is keyed, as at 26, to the shaft.

The welding head 10 includes a depending guide sleeve 27, within which sleeve is mounted a return spring 28—see FIG. 2. The lower end 29 of the spring 28 abuts against an insulating fiber washer 30' disposed against an inturned annular shoulder or spring seat 30 formed by the lower end of the sleeve 27. A downwardly opening aperture 31 is formed at the lower end of the sleeve. The diameter of the opening 31 is greater than the diameter of the opening formed in the insulated washer 30', to insulate the rod against electrical contact with the lower end of the sleeve 27.

A guide plate 33 is bolted to the bridge portion 12c of the yoke 12, the guide 33 including a central aperture 34, encircling the electrode carrier rod 32. The uppermost end 35 of the spring 28 is biased against a stop plate 36 fixed to the rod 32, it being understood that the coil spring 28 is compressed within the sleeve 27, forcing the plate 36 upwardly against an insulating member (not shown) disposed against the under surface of the bridge 12c of yoke 12, thereby vertically locating the carrier rod. A follower member 37 is fixed to the upper end of the carrier rod, the follower member being formed of tough and wear-resistant insulating material, such as a filled phenolic material or the like. The guide member 33 includes a fiber guide washer 38 of insulative material having an internal aperture of lesser diameter than the aperture in the guide member 33. The cam 25 lies within a slot 39 formed within the follower 37.

It will thus be seen that when the drive shaft 22 is rotated in a clockwise direction when viewed in the orientation of FIG. 2, the cam 25 is driven downwardly into the slot 39, causing the follower 37 and the carrier rod 32, to which the follower is attached, to be urged downwardly against the spring pressure of the spring 28. It will be seen that, by reason of the arrangement of the various insulative washers or guides and the insulated nature of the follower 37, the carrier rod is electrically isolated from the remainder of the welding head assembly 10.

The rod 32, at the lower end thereof, carries a conductive block 40 of copper or like material, the block being held to the rod by a bolt 41, the head of which bears against the under surface of the block and the shank of which is threaded into the rod 32.

The block 40 has bolted thereto, in electrically conducting relation, a conduit holder 42 which is, in turn, conductively connected to one conduit 43 of the secondary of a welding transformer. The block 40 includes a vertically directed aperture 43' and is split, as at 44—see FIG. 1, to provide a clamp arrangement for adjustably receiving vertically directed electrode 45. The rod 45 extends upwardly through the aperture 43 and may be locked in any desired position relative to the block by clamp bolt 46.

A welding electrode 47 is mounted to the lower end of the rod 45, the electrode 47 including an upwardly directed boss 48, intimately receiving the rod, and a lower, planar electrical contact surface 49 which, in accordance with the preferred embodiment of the invention, is desirably oriented in a precise horizontal plane.

The cross-shaft 22 includes an integral extension portion 50, a reach portion 51 and a drive extension 52. The drive extension 52 extends into an aperture 53 formed on a generally L-shaped drive arm 54—see FIG. 3. The drive arm 54 includes a base leg 55 and a branch leg 56 of lesser transverse dimension than the leg 55, the leg 56 including a bearing aperture 57 within which is mounted bearing sleeve 58. The bearing sleeve is rotatably mounted over the extension portion 50 of the cross-shaft 22.

A bifurcated operator arm 59 includes side branches 60, 61 which span the branch leg 56 of the arm 54—see FIG. 7. The branches 60, 61 are provided with coaxial apertures 62, 63, the apertures being pivotally mounted on the bearing sleeve 58. Thus, the operator arm 59 is permitted to pivot relative to the drive arm 54 about a pivot axis coincident with the axis of the bearing sleeve 58.

The operator arm 59 includes a cylindrical recess 64, within which recess is received an extended operator lever 65. A bolt 66 extends through an aperture 67 in the arm 59 and into a tapped aperture 68 formed in the operator lever 65, thus to retain the operator lever within the recess 64.

From the above description it will be evident that there is defined between the bifurcated legs 60, 61 of the operator arm 59 an open space or channel within which is mounted a switch member 69 which controls the welding circuit. A cap or cover plate C (FIG. 3) may be secured to the arm 59 to cover the channel.

The switch 69 is fixed to branch 61, as by machine screws 70, 70. The switch includes a depending contact operator plunger 71 which is spring biased outwardly toward a recess 72 formed in the drive arm 54. As will be evident from the solid line position of the parts shown in FIG. 3, the end portion of the plunger 71 is spaced a slight distance from the opposed wall of the recess 72.

The operator arm 59 is formed with a blind recess 73, receiving the upper end of a spacer spring 74. The lower end 75 of the spacer spring 74 is received in a recess 76 formed in the drive arm 54. An adjustment screw 77 is threaded upwardly into tapped aperture 78 in the arm 54, the aperture 78 being in substantial coaxial alignment with the recess 76.

The adjustment screw 77 includes a compression plate 79 at its uppermost end, the lower end 75 of the spring 74 being pressed against the plate 79. A spacer washer or washers 80 are interposed between the head 81 of the adjustment screw 77 and the lower face 82 of the arm 55. It will be appreciated that the pressure exerted on the spring 74 will be a function of the number of spacer washers interposed between the head 81 of the screw 77 and the under surface 82 of the arm 55. The greater the number of washers, the less the compression applied to spring 78 and vice versa.

The spacing of the jaws in the normal or relaxed condition of the arms 54 and 59 is defined by a spacer bolt 83. The shank of the bolt 83 is threaded into a complemental tapped aperture 84 formed in the upper or operative arm 59.

The lower portions of the retainer bolt 83 are disposed within a recess 85 extending through the lower or drive arm 54. The recess 85 includes an upper channel 86 whose diameter exceeds by a substantial margin the outside diameter of the retainer bolt 83, so as to permit a range or degree of tilting of the bolt within the aperture.

The bolt includes a head portion 87 having an upwardly directed annular shoulder 88. The head portion of the bolt 87 lies within a large diameter portion 89 of the recess 85. A stop shoulder 90, formed by the junction between the small recess portion 86 and the large recess portion 89, engages against the upwardly directed shoulder 88 of the bolt 83 under the spreading forces exerted by the spring 74 biased between the arms 54 and 59.

From the foregoing description it will be seen that the spreading spring 74 maintains a normal spread or spaced-apart relation between the arms 54 and 59, the degree to which the arms may spread being limited by the adjusted position of the bolt 83.

It will further be understood that a continued pressure exerted against the operator lever 85 will be communicated, through the medium of the spreader spring 74, to the lower or drive arm 54. The balance between the spreading forces exerted by the spring 74 and the upward force exerted by the lift spring 28 operating within sleeve 27 is such that when the operator arm 65 is shifted, the spring 28 will be compressed in advance of any substantial compression of the spring 74.

It will be further understood that when further downward movement of the electrode assembly is prevented, in a manner hereinafter explained, the operator arm 59 will be permitted to pivot clockwisely as viewed in FIG. 3 relative to the drive arm 54 by a compression of the spring 74.

It will be further appreciated that with a sufficient compression of the spring 74, the end of the plunger 71 of the switch 69 will engage against the floor of recess 72, causing a closing of the switch contacts controlled by the plunger 71.

Turning now to FIGS. 4, 5 and 6, there is shown therein, by way of illustration, welding electrode 47 in operating relation relative to a specially formed welding pin which is the subject of a separate application filed on even date herewith. The welding pin 91 is disposed atop a batt 92 of insulative material which is to be attached by the pin to a substrate 93, such as the wall of a large piece of sheet metal to be subsequently formed into a duct. As more fully set forth in my said application, the pin is especially formed to provide a geometry in which pressure applied to the head of the pin by the under surface 49 of the welding electrode 47 will be effective to shift the shank portion 94 of the pin into precise perpendicular alignment relative to the substrate 93.

By using a suitably adjusted pressure control switch to initiate the weld, if by some mischance the pin is not perpendicular, sufficient pressure could not be generated to induce a current flow since the pin would bend before developing forces necessary to trigger a welding current. In the absence of a pressure-responsive device, a welding circuit could flow, resulting in a partial fusion, requiring the removal of the partially fused, miswelded pin.

As will be appreciated from the progression of views, when an initial pressure is applied to the operating handle 65, the jaws 54 and 59 will move as a unit since the power of the spring 74 is sufficient to cause a compression of the spring 28 without material foreshortening of the spring 74. Continued pivotal movement of the operating handle 65 causes the arms 54 and 59 to move as a unit, causing the cam 25 to shift clockwisely, as viewed in FIG. 2, within the slot 39 in the follower 37, causing a continued camming of the rod 32 carrying the electrode assembly. Continued downward movement of the operator arm will bring the under surface 49 of the electrode into contact with the uppermost portion 95 of the head 96 of the welding pin 91.

As will be seen by comparing FIGS. 4 and 5, the plane of the head 96 of the pin 91 will be progressively caused to conform to the plane of the under surface 49 of the electrode, the final alignment or coplanar arrangement being achieved only after the point 97 of the pin is brought into firm contact with the substrate 93.

In view of the soft and readily penetrated nature of the insulator batt 92, the continued downward movement of the welding electrode has not encountered any substantial resistance other than that caused by the spring 28. However, after the point 97 of the pin has been firmly pressed against the substrate 93 and the shank of the pin is in precise perpendicular alignment with such substrate, substantial continued downward movement of the electrode 47 or the electrode carrier rod 32 to which the electrode is attached will no longer be possible. Thus, at this point the lower arm 54 is no longer free to pivot since movement of the arm is keyed directly to movement of the electrode carrier rod 32 by the U-shaped assembly 50, 51, 52. However, the upper arm 59 is free to pivot relative to the arm 54 from the solid to the dot and dash position shown in FIG. 3. Ultimately such relative pivotal movement will result in a compression of the spring 74 and a consequent tripping or depression of the switch plunger 71 which controls, either directly or through the medium of a relay, current flow through the primary of a welding transformer.

Therefore, when the switch 69 is tripped, welding current is permitted to flow through conduit 43 to the electrode 47 and thence through the head and shank of the welding pin, into the substrate 93 which has been connected by a ground connection to the other lead of the welding transformer secondary.

It is an important feature of the invention that by adjustment of the compressive forces applied to the spring 74, by varying the number of spacer washers, or by some equivalent method, the pressure with which the tip of the welding pin is urged against the substrate is precisely predetermined. No welding current may flow until such pressure is reached, nor may pressure substantially in excess of the desired pressure be developed in view of the lost motion coupling aforesaid.

I have discovered that the pressure factor is critical to the formation of a proper weld. If an insufficient pressure is applied, optimum flow of welding current during the short weld cycle desired in the formation of welds of this sort cannot be achieved. On the other hand, and unexpectedly, if an unduly high degree of pressure is exerted in advance of initiation of flow of the welding current, the heat of the weld is not concentrated at the tip but, rather, is distributed throughout the length of the shank to a degree which causes damage to the insulating material in the shank and head-adjacent portions of the pin. Without limitation to a specific theory, the overheating is believed to result from a reduction of the resistance at the junction of the pin and substrate, which resistance, when present within controlled limits, is effective to restrict heating effects to a desired area adjacent the tip. Obviously, such damage compromises the holding ability of the welded pin. Frequently, also, the weld itself is not properly formed.

In my copending application, Ser. No. 797,603, there is stressed the importance of providing a welding pin having a high degree of sharpness. Without limitation, it is believed that the failure of pin welding procedures when the weld is formed with an excess of pressure is occasioned, in part at least, by blunting of the pin tip resulting from such excess pressures.

It will be appreciated that the welding apparatus hereof defines a lost motion coupling between the operating handle and the drive member which controls the position of the electrode so that, as soon as a predetermined pressure of the pin against a substrate is sensed, there is, for the first time, permitted a degree of relative movement of the parts against the biasing forces of a spring, which relative movement, in turn, controls the initiation of a current flow.

The device of the present invention enables the rapid and foolproof attachment of welding pins to a substrate through insulating batts, and removes from the operator the requirement of exercising discretion as to the force which should be exerted prior to initiating the welding circuit.

In addition, the adjustable spring member 74 serves the secondary function of continuing to urge the pin toward the substrate after an initial melt has taken place. Thus, even if the operating handle is maintained at a fixed position, the initial melting of the tip will cause an expansion of the spring 74, resulting in the desired feed effect.

Having thus described the invention and illustrated its use, what I claim as new and desire to be secured by Letters Patent is:

1. Welding apparatus comprising a horizontal support rail, a welding head mounted on such rail in fixed vertical position, an electrode carrier member journaled for vertical shifting movement in said head and terminating in an upper end defining a follower portion, a welding electrode at the lower end of said carrier member, a cross rod mounted on said head for pivotal movement about a horizontal axis, a carrier drive cam mounted on said cross rod, said drive cam and follower portion being positioned to coact and shift said carrier member downwardly responsive to rotation of said cross rod, a drive arm fixed to said cross rod, an operating arm pivotally journaled on said cross rod and disposed in predetermined, spaced relation to said drive arm, said operating arm including an extending operating lever, adjustable spring means mounted on one said arm and biased against the other said arm for yieldingly maintaining said arms in said spaced relation, switch means on one said arm including a movable contact portion positioned to engage the other said arm, said contact portion being moved to welding circuit activating position responsive to predetermined movement of said operating arm relative to said drive arm.

2. The device of claim 1 and including lift spring means for maintaining said carrier member in a normal elevated position, the force required to shift said operating arm relative to said drive arm exceeding the force required to depress said carrier member against the influence of said lift spring means.

3. Welding apparatus comprising a welding head disposed at a predetermined vertical plane, an electrode carrier member mounted on said head for vertical shifting movement, an electrode member depending from said carrier, lift spring means on said head for urging said carrier toward a normal raised position, an operator lever movably mounted on said head, drive means interposed between said lever and said carrier for shifting said carrier downwardly responsive to movement of said operating lever, said drive means including a lost motion coupling means permitting relative movement of said lever and said carrier, adjustable spring means in said coupling means for varying the forces required to be exerted between said lever and carrier before achieving said relative movement, and switch means positioned to be operated responsive to a predetermined relative movement of said parts for activating a welding circuit to said electrode, said adjustable spring means functioning to induce a downward movement of said electrode responsive to a foreshortening of a welding pin fed by said electrode.